United States Patent [19]
Cox

[11] 4,181,149
[45] Jan. 1, 1980

[54] QUICK DISCONNECT ROTARY VALVE COUPLING

[75] Inventor: Don C. Cox, Smithfield, Tex.

[73] Assignee: Otis Engineering Corporation, Dallas, Tex.

[21] Appl. No.: 785,365

[22] Filed: Apr. 7, 1977

[51] Int. Cl.² .................... F16L 37/10; F16L 37/28
[52] U.S. Cl. ..................... 137/614.02; 137/614.03; 251/149.2; 251/149.6
[58] Field of Search ............ 137/614.02, 614.03; 251/149.2, 149.6; 285/1, 304, 86

[56] References Cited

U.S. PATENT DOCUMENTS

| | | | |
|---|---|---|---|
| 151,885 | 6/1874 | King | 137/614.06 |
| 222,326 | 12/1879 | Stevens | 137/614.06 |
| 223,183 | 12/1879 | Stevens | 137/614.06 |
| 2,948,553 | 8/1960 | Gill et al. | 137/614.02 |
| 2,991,090 | 7/1961 | Cenzo | 137/614.02 |
| 3,078,068 | 2/1963 | Romney | 137/614.03 |
| 3,097,867 | 7/1963 | Saloum | 285/277 |
| 3,382,892 | 5/1968 | Cerbin | 137/614.02 |
| 3,613,726 | 10/1971 | Torres | 285/86 |
| 3,630,214 | 12/1971 | Levering | 137/68 |
| 3,921,656 | 11/1975 | Meisenheimer et al. | 137/614.02 |
| 4,023,584 | 5/1977 | Rogers et al. | 137/614.03 |

*Primary Examiner*—Martin P. Schwadron
*Assistant Examiner*—A. Michael Chambers
*Attorney, Agent, or Firm*—Vinson & Elkins

[57] ABSTRACT

A coupling having two valved sections. The valves of each section are open when the sections are joined together and the valves close whenever the sections separate.

27 Claims, 8 Drawing Figures fig. 2 fig. 5 fig. 6 fig. 7

QUICK DISCONNECT ROTARY VALVE COUPLING

BACKGROUND OF THE INVENTION

A. Field of the Invention

This invention relates to a coupling having two valved sections. When the valved sections are joined, the valves of each section open and flow may be established through the coupling. When the valved sections are separated, the valves of each section close.

B. The Prior Art

Poppet valved couplings, such as disclosed in U.S. Letters Pat. No. 3,630,214 are known. Poppet valved couplings do not include a full open bore which is desirable for high volume flow rates. Additionally, the two sections of the coupling disclosed in U.S. Pat. No. 3,630,214 are not readily adapted to be joined together without a careful alignment of the two sections and without careful manipulation of the sections.

Some couplings include closure members which are initially disposed in a receptacle adjacent and out of the flow path through the coupling. Separation of the coupling sections results in the closure members moving to a position preventing flow through the section's flow path. (See U.S. Letters Pat. Nos. 151,885; 222,326; and 223,183.) The closure members for the disclosed couplings are not automatically movable to their positions out of the flow path upon joinder of the coupling sections.

A coupling having two sections, each with a rotatable ball valve, is disclosed in U.S. Letters Pat. No. 3,921,656. The ball valves are not automatically rotated to a position permitting flow through the coupling upon joinder of the coupling sections.

Couplers for air conduits may include a ball valve. Generally such couplers include one ball valved section which joins to a non-valved connector. They do not provide a valve for closure of the non-valved connector when the coupler is separated.

OBJECTS OF THE INVENTION

It is an object of this invention to provide a coupling with two coupling sections, each section of which includes a full bore opening valve which valves both open when the coupling sections are joined.

It is another object of this invention to provide a coupling having two coupling sections each of which includes a full bore opening valve, which valves automatically open when the coupling sections are joined and which valves automatically close when the coupling sections separate.

It is another object of this invention to provide a coupling having two coupling sections, each section of which includes a full bore opening valve which valves automatically open when the coupling sections are joined and which automatically close when the coupling sections separate, wherein the coupling sections may be separated upon the application of a predetermined tension load.

It is another object of this invention to provide a coupling in accordance with the previous objects wherein the coupling sections may be easily aligned and joined together.

It is another object of this invention to provide a coupling in accordance with the previous objects wherein the coupling sections are keyed to enable the joinder of one coupling section to only its designed, corresponding, co-keyed other coupling section.

These and other objects and features of advantage of this invention will be apparent from the drawings, detailed description, and appended claims.

BRIEF DESCRIPTION OF THE DRAWINGS

In the drawings, wherein like numerals indicate like parts and wherein an illustrative embodiment of this invention is shown.

DETAILED DESCRIPTION OF THE PREFERRED EMBODIMENT

With the quest for petroleum extending to the more remote regions of the world, the needs of specific regions are creating new and specific equipment design criteria. Currently, one such region which imposes specific equipment design criteria is the arctic, including the arctic seas and the north slope of Alaska. The coupling of this invention was designed in response to design criteria imposed by an intended use in the arctic.

In the arctic a coupling may be used to connect a hose extending between a stationary platform and a connection on the deck of a floating vessel. Fluids that may be transported through the hose, and thus through the coupling, include a potable water, sewerage, well production fluids, fuel, and drilling fluids. The Environmental Protection Agency is encouraging the use of couplings which prevent fluid loss when the coupling disconnects. Additionally, the expense and difficulty of transporting material to the arctic regions renders materials so transported valuable. This expense and difficulty create an economic incentive to prevent fluid loss during and after the disconnection of a coupling. The severely cold weather in the arctic renders equipment handling difficult. Equipment handling is also difficult on the deck of a floating vessel. Therefore couplings used in the arctic regions are preferably easy to manipulate for connection and disconnection. To enable emergency vessel movement away from a stationary platform, couplings for hoses extending between the vessel and the stationary platform should have an emergency disconnect feature. The emergency disconnect should be accomplished with minimal fluid loss. Finally, it is desirable that the couplings be keyed so that one coupling section can be made up only with a desired corresponding section. Such a keying system prevents fluid mixing since the conduits could be coupled only to their corresponding conduit.

The coupling of this invention meets these requirements imposed by arctic region operating conditions. The coupling is formed in two coupling sections. Each coupling section includes a full bore opening valve. The valves automatically open when the coupling sections are joined together and automatically close when the coupling sections are separated. The coupling sections are joined so that they may separate upon the application of a predetermined tension load. The coupling sections are easily aligned and joined together. They may be keyed so that the sections can be joined only to corresponding keyed sections.

Figure 1:
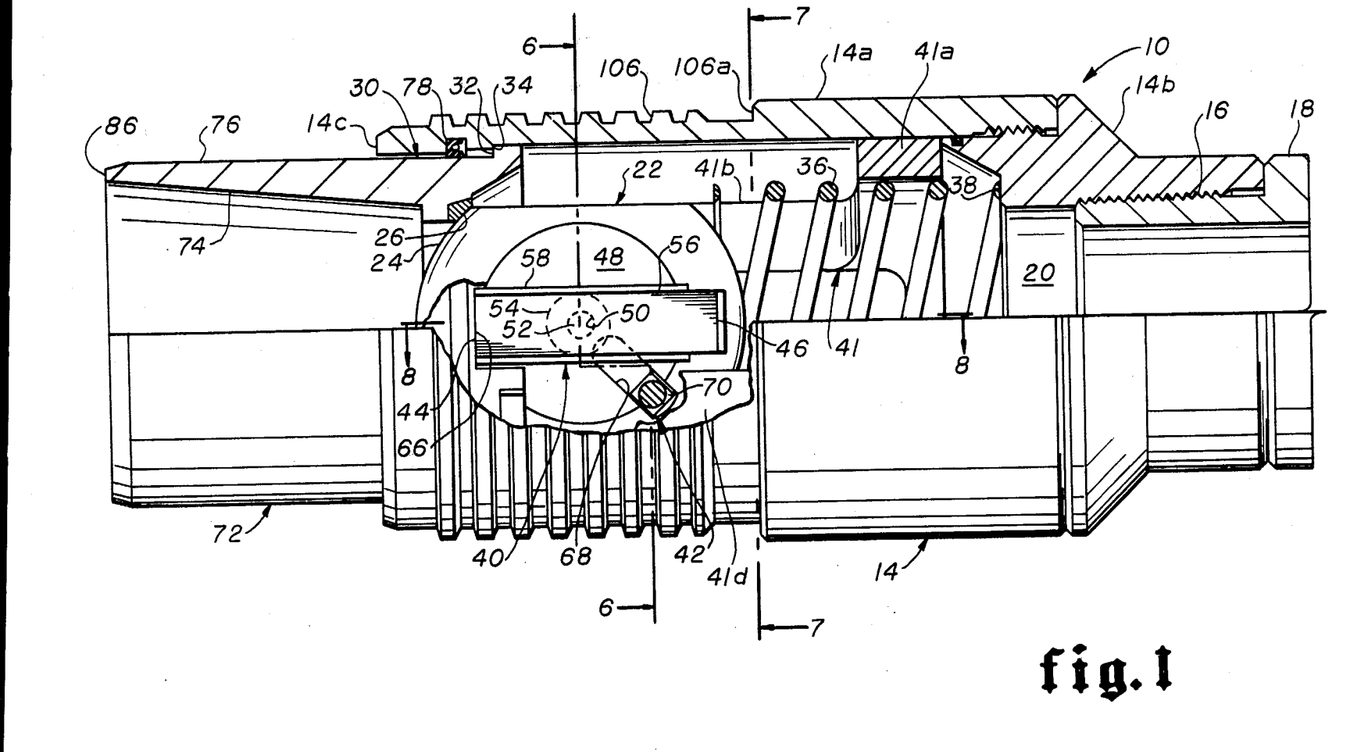
FIG. 1 is a view partly in section and partly in elevation, with some parts broken away, of one coupling section.
Figure 2:
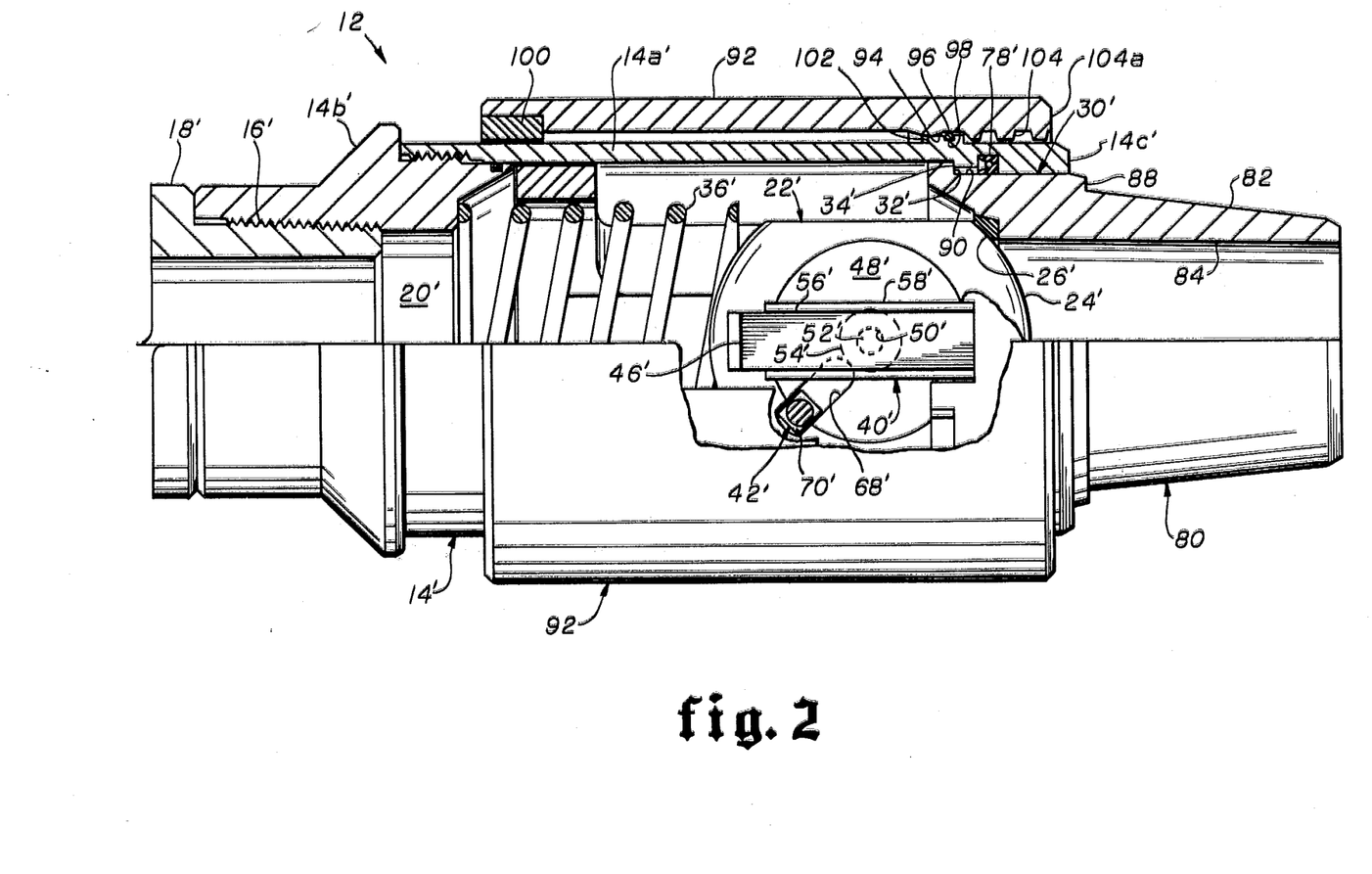
FIG. 2 is a view, partly in section and partly in elevation, with some parts broken away, of the other coupling section.

One coupling section is shown in detail in FIG. 1 while the other coupling section is shown in detail in FIG. 2. The coupling section illustrated in FIG. 1 is a female coupling section 10; in FIG. 2 a male coupling section 12 is illustrated.

Female coupling section 10 includes a housing, a valve to control flow through the housing, and means for urging the valve to a position closing flow through the housing.

The housing, generally indicated at 14, includes interconnected tubular section 14a, for housing the valve, and sub 14b, for connecting the coupling section 10, as at threads 16, to conduit 18 or other fluid communicating means. The housing 14 has a bore 20 therethrough defining the fluid flow path through the female coupling section 10.

Figure 4:
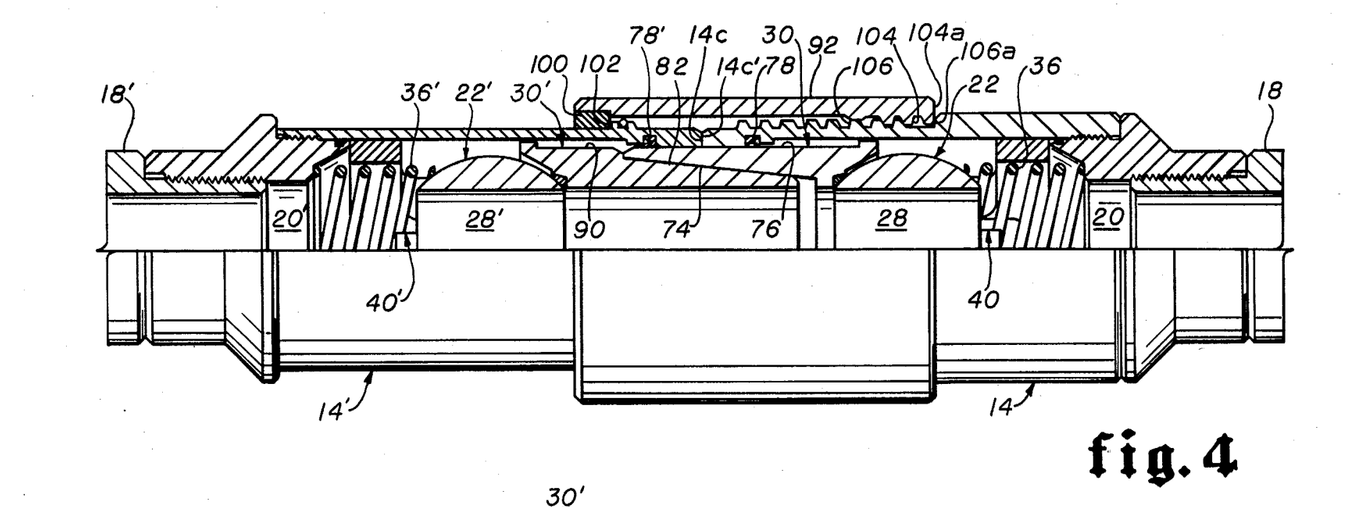
FIG. 4 is a quarter-sectional view of the coupling sections joined together and with the valves open.

Ball valve means 22 is mounted in the housing bore 20 and is movable therein between a first position preventing fluid flow through the bore 20 (See FIG. 1) and a second position permitting fluid flow through the bore 20 (See FIG. 4). Ball valve means 22 includes an outer seating surface 24 for seating with a coacting seat means 26 when ball valve means 22 is in its first position. A passage 28 extends through ball valve means 22 for providing a full, bore opening flow path through the coupling section 10 when ball valve means 22 is in its second position.

Seat means 26 engages ball valve means 22 and may be formed on a movable valve seat member means 30 disposed within the housing bore 20. Stop means, such as flange 32 on valve seat member means 30 and shoulder 34 on housing 14, stops the movement of valve seat member means 30 with respect to housing 14 when ball valve means 22 is in its first, bore closing position. With movement of valve seat member means 30 stopped at this point, fluid pressure can be exerted across ball valve means 22 to force the seating surface 24 into tighter sealing engagement with the seat means 26. The effectiveness of the seal between these elements is therefore increased with increasing pressure.

In addition to fluid pressure, a fail safe means for resiliently urging ball valve means 22 to its first, bore closing position is provided by spring means 36. Spring means 36 is disposed between a shoulder 38 of the housing 14 and control arm 40. Control arm 40 controls the axial movement of the ball valve means 22 and valve seat member means 30 with respect to housing 14. The energy stored by spring means 36 imparts a resilient force upon control arm 40 which force tends to move control arm 40 to the position shown in FIG. 1. Spring means 36 is guided during its expansion and contraction within housing 14 by stationary guide means 41. Guide means 41 includes a ring portion 41a abutting housing sub 14b and four upstanding guide posts 41b, 41c, 41d and 41e. The guide posts extend along the extent of expansion and contraction of spring means 36.

As ball valve means 22 moves axially within housing 14, it also rotates. The illustrated mounting for ball valve means 22 prevents binding during axial movement and rotation of ball valve means 22. With binding prevented, ball valve means 22 is easily movable between its first bore closing position and its second, full bore opening position.

The ball valve mounting of coupling section 10 is illustrated in FIGS. 1, 6, 7, and 8. The ball valve mounting includes control arm 40 and slide pivot means 42. Axial forces to axially move ball valve means 22 and valve seat member means 30 are transmitted through control arm 40. Control arm 40 is connected to valve seat member means 30 at one end 44 and includes a head 46 at the other end which is engaged by spring means 36. Thus, the opposing forces exerted by spring means 36 and exerted on valve seat member means 30 are applied through control arm 40 and are not applied through ball valve means 22. Axial movement of control arm 40, in response to the opposing axial forces exerted by spring means 36 and exerted on valve seat member means 30, results in corresponding axial movement of both ball valve means 22 and valve seat member means 30. There may, therefore, be a designed sealing engagement between the seating surface 24 of ball valve means 22 and seat means 26 of valve seat member means 30. Binding, between ball valve means 22 and valve seat member means 30, is thereby minimized during axial movement of ball valve means 22 and valve seat member means 30.

Non-binding, corresponding axial movement of ball valve means 22 and valve seat member means with respect to the housing 14, is obtained by connecting two control arms 40 to opposite sides of valve seat member means 30. The two control arms 40 extend substantially parallel to the longitudinal axis of the housing 14. Both sides of ball valve means 22 have a flat exterior face 48 and a pivot bore 50 aligned with the axis of ball valve means 22. Each control arm 40 extends along one of the flat faces 48 and has a pin 52 projecting into one of the pivot bores 50. Ball valve means 22 rotates about its axis during axial movement with control arm 40 by rotating about pins 52. To reduce friction between ball valve means 22 and the control arms 40, a spacer bearing 54 surrounds each pin 52 and is disposed between control arm 40 and a face 48 of ball valve means 22.

So that the outer seating surface 24 of ball valve means 22 may easily seat with seat means 26, each control arm 40 is preferably formed from a pusher arm 56 and a pivot plate 58. The pusher arm 56 includes the head 46 of the control arm 40. Each pusher arm 56 has a bore 60 extending therethrough. A bolt 62 is disposed in the bore 60 and screws into a threaded boss 64 of valve seat member means 30 for fastening control arm 40 to valve seat member means 30. Each pivot plate 58 is a U-shaped member and includes a pin 52 upon which ball valve means 22 rotates. The pivot plates 58 are disposed along opposed, facing portions of the pusher arms 56 (See FIG. 6) and are confined, axially, between heads 46 of the pusher arms and a shoulder 66 of valve seat member means (See FIGS. 1 and 8). However, the pivot plates 58 are preferably slightly shorter (approximately by 1/100th of an inch) than the distance between the heads 46 and the shoulders 62. The pivot plates 58 may thus move axially a small amount with respect to the pusher arms 56. That small amount of axial movement enables sealing, seating contact between seating surface 24 and seat means 26 without requiring precision tolerances among ball valve means 22, seat means 26 and pins 52.

A moment arm for rotating ball valve means 22 within the housing bore 20 is provided by the engagement of sliding pivot means 42 with slot 68 formed in the face 48 of ball valve means 22. Sliding pivot means 42 is stationary with respect to the housing 14. It is the axial movement of ball valve means 22 with respect to the housing 14, and sliding pivot means 42, that causes rotation of ball valve means 22. To produce a uniform moment arm to rotate ball valve means 22, sliding pivot means 42 includes two opposed pivot pins 42 each of which engages a separate slot 68 on opposite faces 48 of ball valve means 22. Each pivot pin 42 is formed on one of the guide posts. Friction between pivot pins 42 and the slot 68 are reduced by a bearing 70 which surrounds each pin 42.

With such a mounting system, ball valve means 22 can be freely moved between its positions opening and closing the bore 20. Control arm 40 maintains the axis of ball valve means 22 along the longitudinal axis of the housing 14 during movement of ball valve means 22. All axial forces to move ball valve means 22 are transmitted through control arm 40. There are thus no vise-like, binding forces action upon ball valve means 22. Ball valve means 22 rotates about its axis on pins 52. It is turned by slide pivot means 42. Bearings 54 between the pins 52 and ball valve means 22 and bearings 70 between the pivot pins 42 and ball valve means 22 reduce friction during movement.

The female coupling section 10 also includes means for mating with a complementary means of the male coupling section 12. When these complementary means have mated, the two coupling sections 10 and 12 are aligned, may be joined together, the valves of each coupling section opened, and a flow path established through the coupling.

The means for mating of the female coupling section 10 includes female nose guide means 72 formed on valve seat member means 30. Female nose guide means 72 includes an internal, tapered female guiding surface 74 for mating with the complementary means for mating of the male coupling section 12. Female nose guide means 72 also includes an outer cylindrical surface 76. Seal means 78 carried by housing 14 seals between the outer cylindrical surface 76 of female nose guide means 72 and housing 14. For female coupling section 10, seal means 78 is effective between surface 76 and housing 14 throughout the entire extent of axial movement of valve seat member means 30 with respect to housing 14.

The elements of the male coupling section 12 correspond to the elements of the female coupling section 10 except for the means for mating. The elements of male coupling section 12 which correspond to the elements of female coupling section have been designated with the same numerals as the elements in the female coupling section 10 except for the addition of a'.

The means for mating of the male coupling section 10 comprises a male nose guide means 80 formed on valve seat member means 30'. Male nose guide means 80 includes an external, tapered male guiding surface 82 for mating with the complementary internal tapered female guiding surface 74 of female nose guide means 72. Male nose guide means 80 also has an internal bore 84 through which fluids may flow when the coupling sections are joined together.

When the coupling sections 10 and 12 are separated, both the female nose guide means 72 and male nose guide means 80 extend beyond the ends 14c and 14c' of the respective sections' housing 14 and 14' and away from the respective ball valve means 22 and 22' of each coupling section 10 and 12. (See FIGS. 1 and 2). Each guide means 72 and 80 is therefore visible. The alignment and joining of the female and male guide means 72 and 80 may be visually inspected. When the guide means 72 and 80 have been joined together so that they mate with each other (See FIG. 3), the end 86 of one (e.g., of female nose guide means 72) engages a shoulder 88 of the other (e.g., of male nose guide means 80). At the same time, the male guiding surface 82 of male nose guide means 80 engages and mates with the female guiding surface 74 of female nose guide means 72. The engagement of the two complementary tapered guiding surfaces 74 and 82 precisely aligns the two coupling sections 10 and 12. Once the coupling sections 10 and 12 are so aligned, they may thereafter be joined together in a manner which opens the valves of each section.

Figure 3:
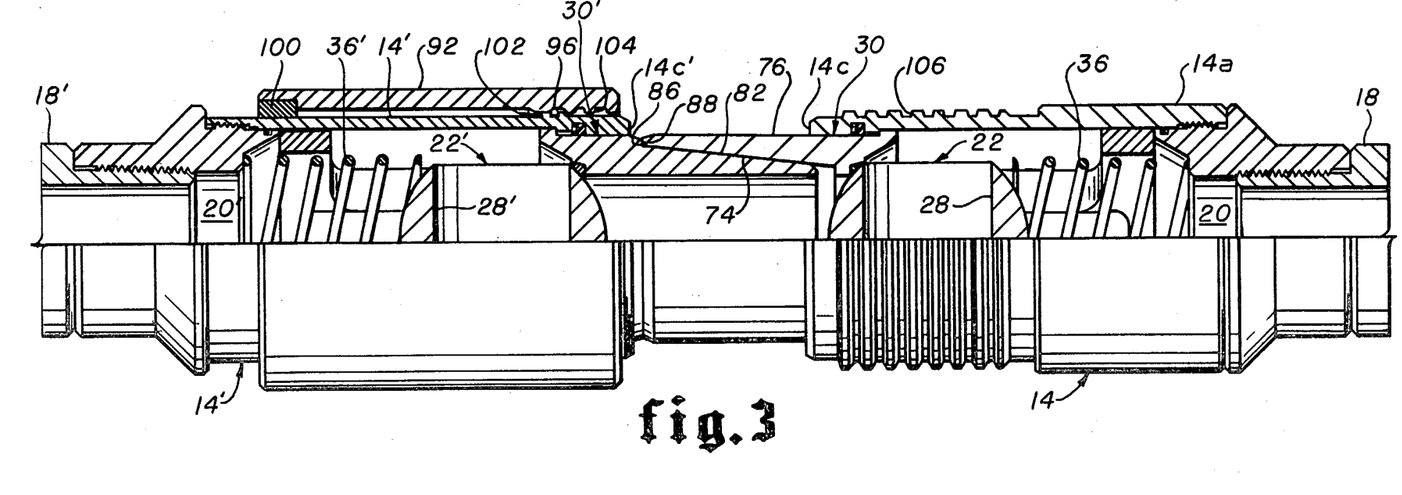
FIG. 3 is a quarter-sectional view of the coupling sections prior to being joined together and with the valves closed.

Prior to joining the coupling sections 10 and 12 together, the ends 14c and 14c' of the respective section housings 14 and 14' are spaced (See FIG. 3). The coupling sections 10 and 12 are joined together in a manner that moves the housings 14 and 14' with respect to their respective valve seat member means 30 and 30'. Because of the mating engagement of the guide means 72 and 80, the joining together of the coupling sections 10 and 12 is accomplished by advancing the housings 14 and 14' towards each other while the valve seat member means 30 and 30' remain stationary with respect to each other. When the guiding means 72 and 80 have engaged each other, the respective section housings 14 and 14' are spaced a sufficient distance so that upon advancing the two housings 14 and 14' towards each other, each housing 14 and 14' moves axially with respect to its valve seat member means 30 and 30' a distance sufficient to rotate both of the ball valve means 22 and 22' to their full, bore opening positions (See FIG. 4).

Seal means 78 and 78' maintain an effective seal between the respective housings 14 and 14' and the valve seat member means 30 and 30', even during movement of the housings with respect to the valve seat member means. When the coupling sections 10 and 12 are separated, and prior to advancing the sections' housings 14 and 14' together, seal means 78 of the female section 10 seals between cylindrical surface 76 of valve seat member means 30 and housing 14 and seal means 78' seals between cylindrical surface 90 of valve seat member means 30' and housing 14'. When the coupling sections 10 and 12 are joined and the housings 14 and 14' have been advanced together, seal means 78 continues to seal between cylindrical surface 76 and housing 14 while seal means 78' now seals between cylindrical surface 76 and housing 14'. The comating, engaged female guiding surface 74 and male guiding surface 82 do not have to provide a seal. Fluid may seep between these surfaces 74 and 82 when the coupling sections 10 and 12 are joined together (See FIG. 4). Seal means 78 and 78' prevent any such seeped fluid from leaking to the surrounding environment.

The coupling additionally includes means for joining the two coupling sections 10 and 12 together. The joining means advances the two housings 14 and 14' together after the comating means of each have engaged and have aligned the coupling sections 10 and 12. The joining means is sized so that prior to advancing the two housings 14 and 14' together it can span the distance between the spaced housings 14 and 14' and engage both. The joining means is also sized so that after it has engaged both housings 14 and 14' it can advance the two housings 14 and 14' towards each a distance sufficient to rotate both of the ball valve means 22 and 22' to their full, bore opening position. Once the housings 14 and 14' have been so advanced together, the joining means releasably maintains the housings 14 and 14' together with each of the ball valve means 22 and 22' in its full, bore opening position.

The joining means may comprise make-up collar means 92 carried on one of the housing means 14 and 14'. For the coupling illustrated, make-up collar means 92 is positioned on the male coupling section 12 around housing 14'. Make-up collar means 92 is axially movable with respect to the coupling section 12 between a retracted position (See FIGS. 2 and 3) and an extended position (See FIG. 4). The retracted position of make-up collar means 92 provides visibility for the insertion of male nose guide means 80 into female nose guide means 72.

Means are provided for releasably maintaining make-up collar means 92 in its retracted position. The releasable maintaining means may include a chamferred, detent shoulder means 94 formed on make-up collar means 92 and resilient detent means, such as O-ring 96, carried within an external groove 98 of the housing 14'. When make-up collar means 92 is in its retracted position, O-ring 96 engages detent shoulder means 94. To move make-up collar means 92 to its extended position, a force is imparted to make-up collar means 92. The chamfer of detent shoulder means 94 forces O-ring 96 into groove 98. Once detent shoulder means 94 has been moved past O-ring 96, O-ring 96 no longer restricts axial movement of make-up collar means 92.

Stop means stops the axial movement of the collar means 82 with respect to coupling section 12 when make-up collar means 92 is in its extended position. The stop means may comprise stop sleeve 100 carried by make-up collar means 92 and stop shoulder 102 on housing 14'. With make-up collar means 92 stopped at its extended position, advancing means, for advancing the two housings 14 and 14' together, may be engaged and employed.

The advancing means advances the two housings 14 and 14' together by moving the one housing 14 axially with respect to make-up collar means 92. The advancing means may include internal threads 104 of make-up collar means 92 and external, mating threads 106 of housing 14. For ease of engagement and advancement, the threads 104 and 106 are preferably the acme threads illustrated.

Figure 5:
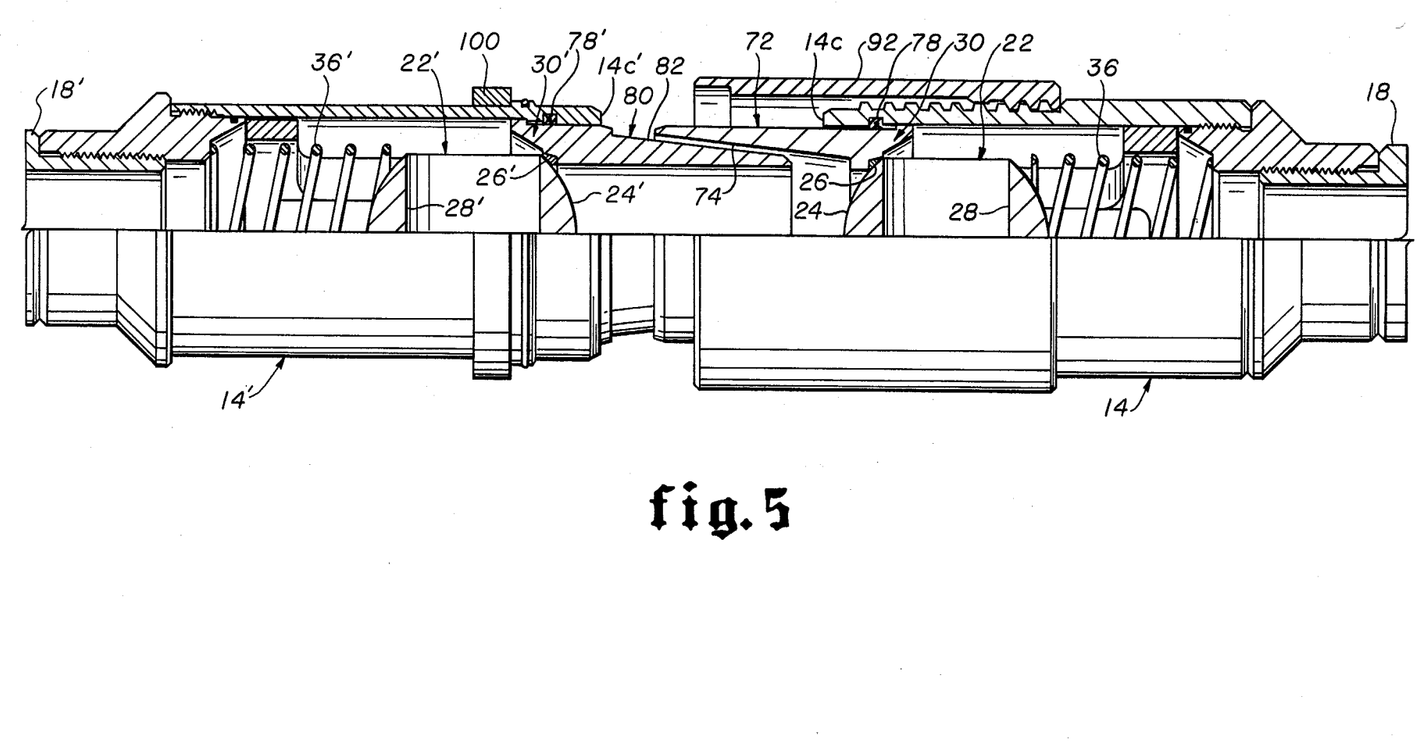
FIG. 5 is a quarter-sectional view with the coupling sections separated and the valves closed.
Figure 6:
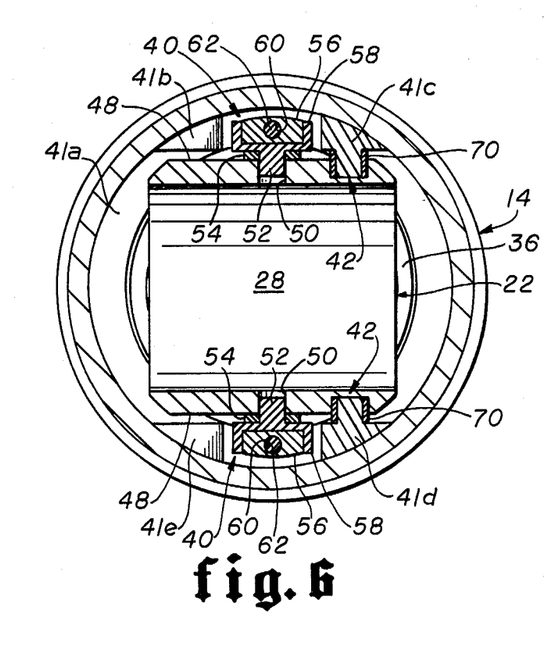
FIG. 6 is a cross-sectional view taken along line 6—6 of FIG. 1.
Figure 7:
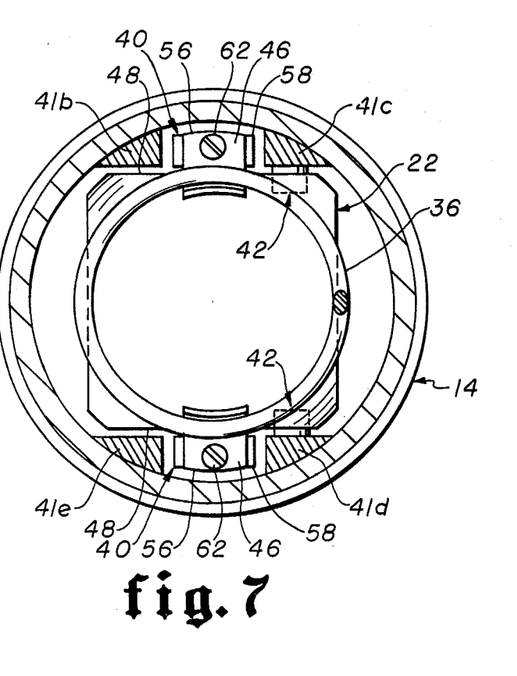
FIG. 7 is a cross-sectional view taken along line 7—7 of FIG. 1.
Figure 8:
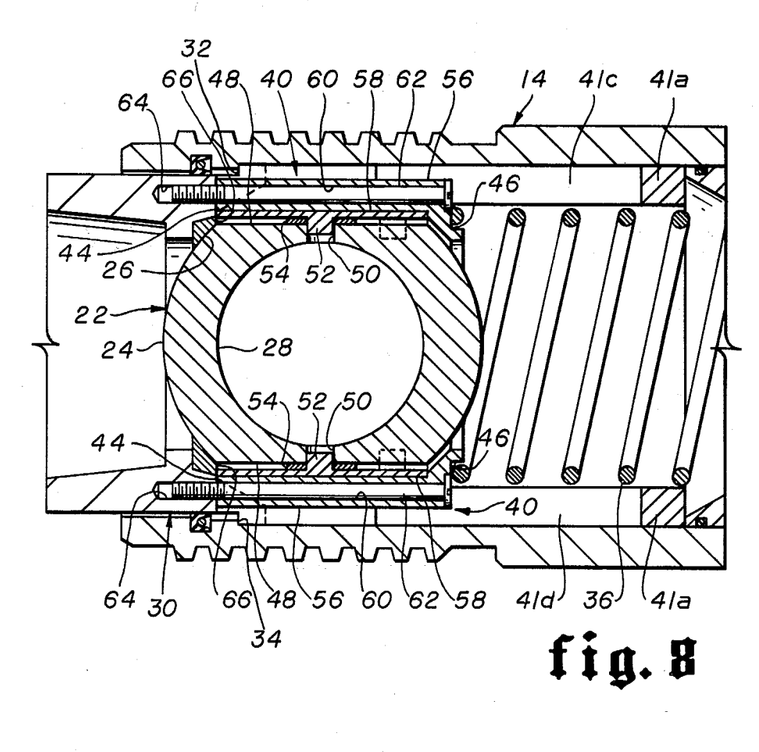
FIG. 8 is a partial cross-sectional view taken along line 8—8 of FIG. 1.

The joining means may be tension releasable. Upon an application of a predetermined tension force along the longitudinal axis of the coupling, the coupling sections 10 and 12 separate. The tension releasable joining means may be provided by having releasable stop means for make-up collar means 92. A designed interference fit between stop sleeve 100 and make-up collar means 92 would enable a disengagement of make-up collar means 92 and stop sleeve 100. Upon disengagement, the joining means, including make-up collar means 92, would no longer be effective to maintain the coupling housings 14 and 14' in abutment. The coupling sections 10 and 12 would be separated (See FIG. 5).

The joining and advancing means may be keyed so that a male coupling section 12 may be joined only to co-keyed female coupling sections 10. Such a keying arrangement would be desirable if a multiplicity of conduits, each of which confined a different fluid, were to be coupled to a corresponding multiplicity of conduits. Under such circumstances, keying the coupling sections would prevent crossing of the conduits and co-mingling of fluids. One manner of keying the coupling sections is to vary the diameters of threads 104 of make-up collar means 92 and threads 106 of housing 14. Both the outside diameter of the roots and tips of external threads 106 and the inside diameter of the roots and tips of internal threads 104 may be varied. The threads 104 and 106 can engage only if the outside diameter of mating threads 106 is slightly less than the inside diameter of threads 104. Keyed threads 104 and 106 would permit a female coupling section 10 to be joined to a male coupling section 12. Non-keyed threads 104 and 106 would prevent joinder of the coupling sections 10 and 12.

In operation, the coupling of this invention is used to selectively co-communicate two fluid communicating means. For example, the female coupling section 10 could be connected to a conduit 18 on the deck of a stationary platform. The male coupling section 12 could be connected to a conduit 18' extending from a floating vessel.

As long as the valved coupling sections 10 and 12 are separated, the valve of each prevents fluid flow. The resilient urging spring means 36 and 36' acts upon control arms 40 and 40', respectively. The force of spring means 36 and 36' maintains each ball valve means 22 and 22' in its respective first position, preventing fluid flow through the coupling sections 10 and 12.

Joinder of the coupling sections 10 and 12 moves each ball valve means 22 and 22' to their respective positions permitting fluid flow. Make-up collar means 92 is moved to its retracted position on housing 14'. Male nose guide means 80 is now clearly visible. The coupling sections 10 and 12 are aligned. Male nose guide means 80 is inserted within the female nose guide means 72. The tapered guiding surface 74 and 82 further align the male coupling section 12 with the female coupling section 10. The detent means releasably maintains make-up collar means 92 in its retracted, out of the way position during this alignment and insertion. The sections 10 and 12 are now in the position illustrated in FIG. 3. After male nose guide means 80 has been inserted within female nose guide means 72, make-up collar means 92 is released from detent means by sliding it towards the female coupling section 10. The internal threads 104 of make-up collar means 92 are engaged with the external threads 106 on the female coupling sections's housing 14. At approximately the same time, make-up collar means 92 reaches its extended position with respect to housing 14' and is stopped by the engagement of stop sleeve 100 with the stop shoulder 102. Make-up collar means 92 is then rotated to advance the two housings 14 and 14' together. While the housings 14 and 14' are advancing together, they are moving axially with respect to their respective valve seat member means 30 and 30' and ball valve means 22 and 22'. The opposing forces applied by each of the resilient spring means 36 and 36' and valve seat member means 30 and 30' are transmitted through control arms 40 and 40'. No vice-like, binding forces are applied to the ball valve means 22 and 22'. The respective sliding pivot means 42 and 42' provides the movement arm which rotates the ball valve means 22 and 22' as the housings 14 and 14' are advanced together. When the housings 14 and 14' have been advanced together, with the thread nose 104a of make-up collar means 92 abutting the thread stop 106a, each of the ball valve means 22 and 22' is in its full, bore opening position (See FIG. 4).

The coupling sections 10 and 12 are now joined together. Fluid may be conducted through the coupling. The coupling is fluid tight. Seals 78 and 78' seal between the tubular housing housings 14a and 14a' and the outer cylindrical surface 76 of female nose guide means 72. Fluid in the flow path 20 through the coupling is prevented from leaking to the environment by these seals 78 and 78'.

If desired, the coupling may be disconnected manually. Manual disconnection is accomplished by unthreading make-up collar means 92 from the female coupling section 10. During the unthreading operation, each of the resilient urging spring means 36 and 36' will move the respective valve seat member means 30 and 30' and ball valve means 22 and 22' with respect to their housings 14 and 14' towards their bore closing positions. Complete separation of the coupling sections 10 and 12 enables complete closure. Closure is automatic.

In an emergency, the coupling sections 10 and 12 may be separated without a manual operation. For various reasons, a floating vessel may move away from a stationary platform. There may not be time before such movement is initiated to manually disconnect couplings in conduit extending between the floating vessel and the stationary platform. The coupling of this invention separates upon a tensile loading so that such emergency movement may take place with minimal fluid loss. If a tension load is applied to the coupling along its longitudinal axis, stop sleeve 100 will release from make-up collar means 92. The coupling sections 10 and 12 are no longer maintained in their joined together configuration. The resilient urging spring means 36 and 36' acting upon control arms 40 and 40', respectively, moves valve seat member means 30 and 30' and ball valve means 22 and 22' to their bore closing positions. Closure of coupling sections 10 and 12 is, therefore, also automatic during emergency separation (See FIG. 5).

From the foregoing, it can be seen that the objects of this invention have been obtained. A coupling, with two valved, coupling sections, has been provided. The valves of each coupling section automatically move to a full bore opening position upon joinder of the two coupling sections. The valves of each coupling section also automatically move to a position closing the flow path through each coupling section upon separation of the sections. The coupling sections are easily aligned and joined together by comating nose guides and a joining make-up collar. The collar is releasable from one of the housing of one of the sections so that the coupling sections may be separated in an emergency. Additionally, the coupling sections may be keyed to enable make-up with only co-keyed sections and thereby prevent intermingling of fluid from different conduits.

The foregoing disclosure and description of this invention is illustrative and explanatory thereof and various changes in the size, shape and materials, as well as in the details of the illustrated construction, may be made within the scope of the appended claims without departing from the spirit of the invention.

What is claimed is:

1. A coupling comprising:
   two coupling sections, each of which includes:
      housing having a bore extending therethrough,
      a ball valve axially movable and rotatable within the bore of said housing between a first position closing the bore and a second position opening the bore,
   said ball valve being pivotally connected to said housing section, and having a sliding, pivot means responsive to axial movement of said ball valve within the bore of said housing for rotation of said ball valve,
   means for seating said ball valve,
   means for resiliently urging said ball valve to said first position closing the bore, said resilient urging means automatically moving said ball valve and said seating means to said first position closing the bore when said two coupling sections are separated;
   one coupling section having a female nose guide means,
   the other coupling section having a male nose guide means engageable with said female nose guide means in a non-sealing configuration,
   means, independent of said nose guide means, for releasably joining said two coupling sections together,
   said joining means advancing said two housings together, causing said ball valve and seating means to be moved axially within the bore of the housings and simultaneously cause rotation of said ball valve to said second position opening the housing bore.

2. A coupling comprising:
   two coupling sections, each of which includes:
   a housing having a bore extending therethrough,
   a ball valve axially movable and rotatable within the bore of said housing between a first position closing the bore and a second position opening the bore,
   said ball valve being pivotally connected to said housing section, and having a sliding, pivot means responsive to axial movement of said ball valve within the bore of said housing for rotation of said ball valve,
   means for seating said ball valve,
   means for resiliently urging said ball valve to said first position closing the bore, said resilient urging means automatically moving said ball valve and said seating means to said first position closing the bore when said two coupling sections are separated;
   means for mating one coupling section with a complimentary means for mating of the other coupling section, said mating means assisting in aligning the two coupling sections for joining same together.
   a tension releasable collar on one of said coupling sections, engageable with the other coupling section, for joining said two valved sections together and for releasing said two valved sections for separation upon the application of a predetermined tension load,
   said tension releasable collar advancing said two housings together causing said ball valve and seating means to be moved axially within the bore of said housings and cause essentially simultaneous rotation of each of said ball valve to its second position opening said housing bore.

3. A coupling comprising:
   two coupling sections, each of which includes:
   a housing having a bore extending therethrough,
   a ball valve axially movable and rotable within the bore of said housing between a first position closing the bore and a second position opening the bore, said ball valve being pivotally connected to said housing section, and having a sliding, pivot means responsive to axial movement of said ball valve within the bore of said housing for rotation of said ball valve, means for seating said ball valve, means for resiliently urging said ball valve to said first position closing the bore, means for mating one coupling section with a complimentary means for mating of the other coupling section, said mating means when mated together aligning said two coupling sections, said mating means including a female nose guide means on one coupling section, a male nose guide means on another coupling section, said mating means providing neither sealing or means for securing one coupling section to the other, and means, independent of said mating means, for joining the two housings together after said mating means have been mated, said joining means advancing the two housings together and, when said housings are advanced together a sufficient amount, said joining means coacting with said seating means to move each of said ball valves axially with respect to its housing, rotating said ball valve to its respective second position opening the bore and thereafter holding each ball valve in its second, bore open position.

4. The coupling of claim 3 wherein:

said mating means for one of said two coupling sections includes male nose guide means having a bore for providing a flow path between said coupling sections and having an external tapered guiding surface; and said mating means for the other of said two coupling sections includes female nose guide means having an internal tapered guiding surface for mating with the external tapered guiding surface of said male nose guide means.

5. The coupling of claim 3 wherein said joining means includes:

make-up collar means for making-up said two coupling sections carried by one of said housings;

stop means for stopping the axial movement of said collar means with respect to said one housing; and means for moving the other of said housing axially with respect to said make-up collar means.

6. The coupling of claim 5 wherein said stop means includes:

stop sleeve means carried by said make-up collar means; and stop shoulder means on said one housing.

7. The coupling of claim 5 wherein said stop means is releasable from said make-up collar means.

8. The coupling of claim 5 wherein said stop means includes:

stop sleeve means carried by said make-up collar means;

stop shoulder means on said one housing; and wherein one of said stop sleeve means and said stop shoulder means is releasable from the respective one of said make-up collar means and said one housing.

9. The coupling of claim 5 wherein:

said make-up collar means is movable axially with respect to said one housing between a retracted position and an extended position;

said stop means is effective at said extended position; and said coupling additionally includes releasable maintaining means for releasably maintaining said make-up collar means at said retracted position.

10. The coupling of claim 5 wherein said means for moving the other of said housing means with respect to said make-up collar means includes:

thread means on said make-up collar means; and mating thread means on said other housing.

11. The coupling of claim 10 wherein the diameter of said thread means on said make-up collar means and the diameter of said mating thread means on the other of said housing are keyed to enable engagement of said make-up collar means with only a co-keyed other housing.

12. The coupling of claim 9 wherein said releasable maintaining means includes:

detent shoulder means on said make-up collar means; and resilient detent means on said one housing for releasably engaging said detent shoulder means and releasably maintaining said make-up collar means in said retracted position.

13. A coupling comprising:

two coupling sections, each of which includes:

a housing having a bore extending therethrough, a ball valve movable within the bore of said housing between a first position closing said bore and a second position opening said bore, said ball valve being pivotally connected to said housing section, and having a sliding, pivot means responsive to axial movement of said ball valve within the bore of said housing for rotation of said ball valve, a seat member including means for seating said ball valve, and means for resiliently urging said ball valve to said first position closing said bore, said resiliently urging means moving said ball valve and said seat member to said first position closing the bore when said coupling sections are separated; and means for aligning the two coupling sections together including:

nose guide means formed on said seat member of each of said two coupling sections and extending away from the respective ball valve of each of said two coupling sections, each of said nose guide means being complementary with the other neither of said nose guide means, when engaged, forming a fluid seal with the other, said two nose guide means, when engaged, aligning said two coupling sections, a make-up collar for joining said two coupling sections carried by one of said housings and axially movable independent of said nose guide means thereon between a retracted position and an extended position, stop means for stopping the axial movement of said make-up collar with respect to said one housing at said extended position, means for moving said make-up collar along the other of said housing, and said make-up collar and said two nose guide means coacting so that when said make-up collar is stopped by said stopping means and is moved along said other housing a sufficient amount, each of said ball valves is moved, with respect to its housing, to its second position.

14. The coupling of claim 13 wherein:
said nose guide means formed on said seat member means of one of said two coupling sections includes male nose guide means having a bore for providing a flow path between said coupling sections and having an external tapered guiding surface; and
said nose guide means formed on said seat member means of the other of said two coupling sections includes female nose guide means having an internal tapered guiding surface for mating with the external guiding surface of said male nose guide means.

15. The coupling of claim 13 additionally including:
releasable maintaining means for releasably maintaining said make-up collar means at said retracted position.

16. The coupling of claim 15 wherein said releasable maintaining means includes:
detent shoulder means on said make-up collar means; and resilient detent means on said one housing means.

17. The coupling of claim 13 wherein said means for moving said make-up collar means along the other of said housing includes:
threads means on said make-up collar means; and mating thread means on said other housing.

18. The coupling of claim 17 wherein:
the diameter of said thread means on said make-up collar means is keyed and the diameter of said mating thread means on said other housing means are co-keyed so that said keyed thread means can engage only said co-keyed mating thread means.

19. The coupling of claim 13 wherein:
said stop means is releasable from said make-up collar means.

20. The coupling of claim 13 wherein said stop means includes:
stop sleeve means carried by said make-up collar means; and
stop shoulder means on said one housing.

21. The coupling of claim 13 wherein said stop means includes:
stop sleeve means carried by said make-up collar means;
stop shoulder means on said housing; and
wherein one of said stop sleeve means and said stop shoulder means is releasable from said make-up collar means.

22. A coupling comprising:
two coupling sections, each of which includes:
a tubular housing having a bore extending therethrough,
an adapter sub attached to said tubular housing and adapted to be attached to means for communicating a fluid to said coupling section,
a ball valve axially movable and rotatable within said bore between a first position closing said bore and a second position opening said bore,
said ball valve being pivotally connected to said housing section, and having a sliding pivot means responsive to axial movement of said ball valve within the bore of said housing for rotation of said ball valve,
a valve seat member movable within said bore for seating with said ball valve,
stop means for stopping the movement of said valve seat member means at a position wherein said ball is in said first position,
seal means for sealing between said tubular housing and said valve seat member,
means for resiliently urging said ball valve to said first position, said resilient urging means moving said ball valve and said valve seat member to said first position when said coupling sections are separated; and
tension releasable means for joining said coupling sections together including:
means formed on one end of said valve seat member of each of said two coupling sections with each of mating means being complementary with each other, one of said mating means comprising a male nose guide means formed on said valve seat member one of said two coupling sections and having an external tapered guiding surface, the other of said mating means comprising a female nose guide means formed on said valve seat member of the other of said two coupling sections and having an internal tapered guiding surface for mating with the external tapered guiding surface for mating with the external tapered guiding surface of said male nose guide means neither of said nose guide means, when engaged, forming a fluid seal with the other,
a make-up collar axially movable independent of the nose guide means for joining said coupling sections carried on one of said housings and axially movable thereon between a retracted position and an extended position,
releasable stop means for releasably stopping and holding said make-up collar at an extended position with respect to said one housing,
means for moving the other of said housing with respect to said make-up collar when said make-up collar is in said extended position, said moving means advancing said housings together a distance sufficient to move said ball valve, of each coupling section axially within the bore of the housing and cause rotation of said ball valve to its second position opening the bore and holding said housing together with each ball valve in their respective second positions, and
said releasable stop means releasing said make-up collar from engagement with said one housing upon the application of a predetermined force whereby each of said resilient urging means becomes effective to move each of said ball valves to their respective first positions closing the bore.

23. The coupling of claim 22 wherein said releasable stop means includes:
stop sleeve means carried by said make-up collar means;
stop shoulder means on said one housing; and
one of said stop sleeve means and said stop shoulder means being releasable from one of said make-up collar means and said one housing.

24. The coupling of claim 23 wherein:
the diameter of said thread means on said make-up collar means and the diameter of said mating thread means on said other housing are keyed so that said keyed thread means can engage only co-keyed mating thread means.

25. The coupling of claim 22 additionally including:

releasable maintaining means for releasably maintaining said make-up collar means at said retracted position.

26. The coupling of claim 25 wherein said releasable maintaining means includes:
   detent shoulder means on said make-up collar means; resilient detent means for engaging said detent shoulder means.

27. The coupling of claim 22 wherein said moving means includes:
   thread means on said make-up collar means; and
   mating thread means on said other housing.

* * * * *